(12) United States Patent
Ozkul (10) Patent No.: US 8,671,571 B2
(45) Date of Patent: Mar. 18, 2014

(54) METHOD AND APPARATUS FOR MAKING STATIONARY PARABOLIC SOLAR COLLECTOR

(75) Inventor: Tarik Ozkul, Maltepe (TR)

(73) Assignee: Tarik Ozkul, Maltepe (TR)

( * ) Notice: Subject to any disclaimer, the term of this patent is extended or adjusted under 35 U.S.C. 154(b) by 22 days.

(21) Appl. No.: 13/393,588

(22) PCT Filed: May 26, 2011

(86) PCT No.: PCT/IB2011/052311
§ 371 (c)(1),
(2), (4) Date: Jun. 8, 2012

(87) PCT Pub. No.: WO2012/160420
PCT Pub. Date: Nov. 29, 2012

(65) Prior Publication Data
US 2012/0297622 A1    Nov. 29, 2012

(51) Int. Cl.
*B23P 15/26* (2006.01)
(52) U.S. Cl.
USPC ........................................ 29/890.033; 29/726
(58) Field of Classification Search
USPC .................. 29/284; 60/641.15; 212/199–204, 212/223–226, 228, 230, 312, 315, 317, 212/318; 414/591, 592, 595, 607
See application file for complete search history.

(56) References Cited

U.S. PATENT DOCUMENTS

| | | | | |
|---|---|---|---|---|
| 2,918,179 | A | * 12/1959 | Dewese | ........................ 212/199 |
| 3,186,268 | A | 6/1965 | Hoglund | |
| 3,998,206 | A | * 12/1976 | Jahn | .............................. 126/578 |
| 4,002,032 | A | * 1/1977 | Bash | .......................... 60/641.15 |
| 4,124,277 | A | 11/1978 | Stang | |
| 4,170,985 | A | * 10/1979 | Authier | .......................... 126/689 |
| 4,860,023 | A | 8/1989 | Halm | |
| 5,680,145 | A | * 10/1997 | Thomson et al. | ............. 343/915 |
| 2010/0108057 | A1 | 5/2010 | Cummings et al. | |

FOREIGN PATENT DOCUMENTS

| | | | |
|---|---|---|---|
| DE | 29606714 | 8/1996 | |
| EP | 1947403 | 7/2008 | |
| GB | 1602434 | 11/1981 | |
| JP | 59097460 A | * 6/1984 | ................. F24J 3/02 |

OTHER PUBLICATIONS

Kalogirou "Recent Patents in Solar Energy Collectors and Applications" Recent Patents on Engineering, 2007, 1, 23-33.
Imadojemu "Concentrating Parabloic Collectors: A Patent Survey" Energy Convers. Mgmt. vol. 36, No. 4 pp. 225-237, 1995.

* cited by examiner

*Primary Examiner* — Alexander P Taousakis
*Assistant Examiner* — Matthew P Travers
(74) *Attorney, Agent, or Firm* — Cesari and McKenna, LLP (57) ABSTRACT

This invention is about a method and apparatus for fabricating large scale stationery parabolic solar collector. The method involves use of a robot like apparatus for determining locations and height of support piles to be staked to the ground such that the tips of the piles define contour and shape of a parabolic collector. The reflective panels installed on the support piles form a parabolic shaped mirror which reflects the sun's rays to a well defined focal point. The method of construction is scalable and can be used for fabricating small size parabolic collectors as well as large scale ones. The construction apparatus and method of operation are also used for periodic cleaning of solar collector in a practical and fast manner.

20 Claims, 11 Drawing Sheets

METHOD AND APPARATUS FOR MAKING STATIONARY PARABOLIC SOLAR COLLECTOR

CROSS REFERENCE TO RELATED APPLICATIONS

This application is the national stage entry under 35 USC 371 for PCT/IB2011/052311, filed on May 26, 2011. The contents of the foregoing application are incorporated herein by reference.

FIELD

This invention relates to solar heat collectors, more specifically to components, parts and details of solar heat collectors. It is also related to arrangements of mountings and supports of solar heat collectors. The invention is also related to means for cleaning solar heat collectors. The invention is also related to mirrors with curved surfaces and more specifically to multifaceted mirrors.

BACKGROUND

Parabolic solar collectors are among the best known types of solar collectors for concentrating solar radiation to a focal point. Parabolic collectors are also used for concentrating electromagnetic rays to a spot and used onboard satellites as well as in ground stations for concentrating radiation to a sensor. Database indicates there are numerous patents related to parabolic collectors.

Literature survey indicated several documents that summarize state of the art in parabolic solar collectors. One of the documents is authored by H. E. Imadojemu and published in Vol. 36, No. 4 issue in pages pp. 225-237, 1995 of Energy Conversion Management Journal. This document is titled "Concentrating Parabolic Collectors: a Patent Survey". Another article published is by S. Kalogirou and published in the Journal of Recent Patents on Engineering in 2007, issue #1, pages 23-33. The publication by Kalogirou is titled as "Recent Patents in Solar Energy Collectors and Applications". The state of the art in solar collectors is summarized in these articles.

Parabolic solar collectors are type of mirrors which have parabolic shape and installed facing towards sun. The solar rays coming from the mirror are focused to a specific spot where an energy absorber or a secondary mirror is placed. These types of solar collectors are known as "SRTA" which stands for Stationary Reflector/Tracking Absorber configuration. In this particular configuration the solar concentrator is stationary, but due to changing position of sun, the point where the solar radiation is focused changes continuously in a well defined path. This is where the tracking absorber is used; by placing the absorber always in the focal point of the solar collector, it is possible to receive energy no matter what time of the day is.

The main problem with parabolic type SRTA's is the construction of the parabolic mirror. Although small size parabolic mirrors can be cast efficiently using carefully designed molds, making oversized parabolic mirrors has been difficult and challenging. There have been patents toward methods of making parabolic mirrors such as U.S. Pat. No. 4,124,277 "Parabolic Mirror Construction" and U.S. Pat. No. 4,860,023, "Parabolic Reflector Antennas and Method of Making Same". Another recent patent application; US 2010/010-8057A1, "Inflatable Solar Concentrator Baldwin Method and Apparatus" are among different attempts for making parabolic solar collectors.

The invention declares a method of making stationary parabolic concave mirror and an apparatus specifically designed for this purpose. The primary goal of this invention is to make large scale parabolic mirrors quickly and accurately. One of the most difficult aspects of parabolic mirror construction is formation of the specific parabolic shape accurately. The invention teaches a practical method of determining the exact location and height of the structural elements of the parabolic mirror so that the mirror constructed over the structural elements end up having the required parabolic concave shape.

U.S. Pat. No. 3,998,206 to Jahn discloses a parabolic mirror made from numerous prefabricated mirror tiles arranged on a rib-like structure for forming a parabolic mirror.

Another U.S. Pat. No. 4,002,032 to Bash discloses a solar heated turbine where the solar rays are focused to a target using a parabolic dish like structure.

Another U.S. Pat. No. 4,170,985 to Authier discloses a stationary solar collector and high concentration boiler arrangement for converting focused solar heat to heat transfer liquid.

Yet another U.S. Pat. No. 5,680,145 to Thomson et. Al. discloses a lightweight structure for building parabolic reflectors for solar or electromagnetic reflection purposes.

Japan patent JP 59-097460 issued to Horigome discloses a stationary reflector embedded in the ground and a fiber optic target arrangement which can be moved to focal point of the parabolic reflector to collect the solar rays and conducted to a stationary energy conversion device.

Although all these inventions stated above are somehow related to parabolic reflectors and have a merit on their own, the invention declared in this application discloses a different method for constructing parabolic reflectors.

SUMMARY

The invention declares a method of making stationery parabolic concave mirror and an apparatus specifically designed for this purpose. The primary goal of this invention is to make large scale parabolic mirrors quickly and accurately. One of the most difficult aspects of parabolic mirror construction is formation of the specific parabolic shape accurately. The invention teaches a practical method of determining the exact location and height of the structural elements of the parabolic mirror so that the mirror constructed over the structural elements end up having the required parabolic concave shape.

Another important problem addressed by this invention is the cleaning aspect of parabolic solar collector. Solar collectors require regular cleaning to keep the performance level high. Due to the large surface area of solar collector, dust and dirt builds up on reflective mirrors which degrades the reflective quality. Unless the mirrors are cleaned regularly, the efficiency of the solar collector gets reduced drastically. The cleaning approach used in most contemporary solar collectors is manual cleaning. Often high-pressure washers are used manually for regular cleaning of mirrors. Due to the large surface area of parabolic mirror declared in this invention, manual cleaning would be very slow and tedious. The invention utilizes a robot like apparatus for construction of the parabolic mirror. The apparatus goes thorough some modification after construction is over and later used for automatic cleaning of the solar collector. Due to the automatic nature of cleaning process which requires no manual intervention, the cleaning can be performed during night when solar collector is not utilized.

The construction apparatus of the parabolic mirror comprises a central post and a horizontal jib connected to the post which can rotate around it 360 degrees. The horizontal jib has a trolley which can travel along the length of the jib from center position to the tip. The trolley has a vertical working arm which is positioned perpendicularly with respect to the trolley. The vertical arm mounted perpendicularly to the trolley is free to move up or down under gravity or by external means. The up or down movement of the vertical arm is restrained by a system of pulley and inelastic string which is strategically connected to different parts of the apparatus. The system of pulley and string determines the tip position of the vertical arm as the trolley on the horizontal jib moves back and forth. The arrangement is done such that, as the trolley moves along the jib, the tip of the vertical arm is forced to follow path of a perfect parabola.

The construction apparatus has pile driver mounted on the trolley right next to the vertical arm. The pile driver is a type of equipment used in construction industry for driving stakes or piles into the ground. There are essentially two different kinds of pile drivers used in industry which are known as vibratory and hammer type pile drivers. Hammer type uses a hydraulically or pneumatically activated hammer to drive piles to ground. Vibratory type pile driver uses eccentrically generated vibrations to drive piles to ground. Both types of pile drivers as well as screw driver type arrangements are suitable for this application.

The pile driver and the vertical working arm are both mounted on the trolley in close proximity. The arrangement is done such that pile driver drives piles to the ground down to the height indicated by the vertical arm of the apparatus. A proximity sensor installed at the tip of the vertical arm senses the height of the support piles being driven into the ground. The piles are driven into the ground until the tip of the pile is exactly at the same level indicated by the proximity sensor arrangement attached to the tip of the vertical arm. The pile driver stops as soon as a pile is driven up to the height indicated by the apparatus.

By rotating the horizontal jib incrementally and changing the position of the vertical trolley in regular distances, multiple numbers of piles are driven into the ground. As a result of string and pulley arrangement of the vertical arm, the depth of each pile is different. At the end of pile driving process, the tips of the support piles define the outline of a parabolic mirror. The piles are later covered by reflective material which forms reflective part of the parabolic mirror.

After the construction process is over, the pile driver is removed from the trolley that transverses the horizontal jib since it is no longer needed.

When the construction process is over, the construction apparatus is modified and used this time for cleaning purposes. Since mirror needs frequent cleaning to keep the performance levels high, the vertical working arm of the apparatus is converted to cleaning use by installing cleaning brushes on the vertical arm instead of the pile driver. The pulley and string set up which is used to determine the height of the piles is now used for determining the height of the brushes that clean the parabolic mirror. By rotating the horizontal jib incrementally and moving the vertical trolley along the horizontal jib under computer control, the mirror can be cleaned mechanically during the night.

DESCRIPTION

Now the method of operation and the details of the construction apparatus will be described in detail with the aid of figures.

In the following text, the terms parabolic mirror, parabolic solar collector, parabolic collector all refer to the parabolic solar collector.

Figure 1:
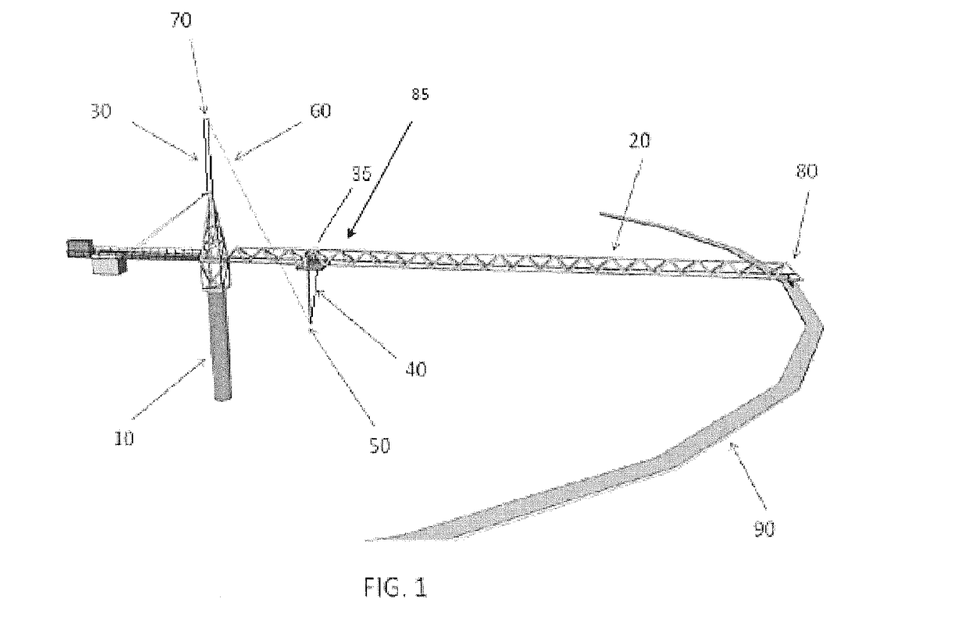
FIG. 1 shows the main parts of the parabolic mirror construction apparatus.

FIG. 1 shows the major parts that comprise the apparatus for making parabolic mirror. The item labeled as 10 is the central post of the parabolic mirror. Item 20 is the horizontal jib which rotates around central post 10 and works as the working arm of the apparatus. Item labeled as 30 is the focal mast of the apparatus. Item labeled as 70 is the end point of the focal mast which defines the focal point of the parabolic mirror. Item 35 is the trolley and item 40 is the vertical working arm of the horizontal jib. Item 50 defines the tip point of the vertical working arm 40 which is equipped with a roller at the end. Item 60 is an inelastic string which is connected to point 70 on one side and to point 85 on the other side. While going from point 70 to point 85 the inelastic string goes over the roller at point 50 and makes a triangular shape. Item labeled as 80 is the tip of the horizontal jib and it is equipped with rollers that rest on rim support 90. The rim support 90 is a circularly shaped platform raised on supports that makes a complete circle around the central post 10.

Central post 10 defines the geometric center of the parabolic solar collector and the axis where the focal point of the parabolic solar collector is located on. Since the focal point parabolic collector will be determined by the central post 10, the location and the orientation of it is of crucial importance to the performance of the solar collector. Declination angle of sun at a specific location on earth is very much related to geographical latitude of that particular place. In a preferred embodiment, the central post 10 should be slanted from perpendicular position for the amount of declination angle to receive the solar radiation in the most optimum manner. The determination of declination angle is well known to the people who are skilled in art. By way of slanting the central post for the amount of declination angle, the parabolic collector constructed around the central post can be made to receive radiation of sun at or near perpendicular angle for maximum duration of the day.

Figure 2A:
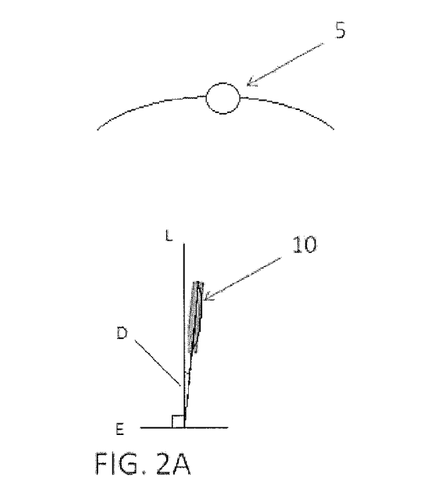
FIG. 2A shows the position of the central post in a slanted mirror application.
Figure 2B:
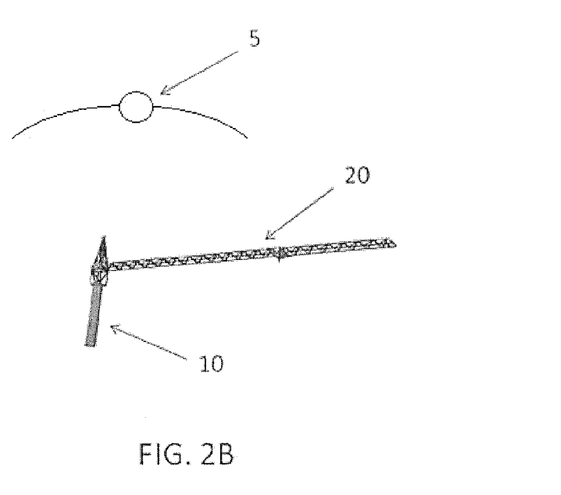
FIG. 2B shows the construction apparatus placed on the central post during a slanted mirror construction process.

The concept explained above is further explained by FIGS. 2A and 2B. FIG. 2A shows the position of the central post with respect to position of the sun in a location other than equator. FIG. 2A shows the central post 10 making angle D with line L which is positioned perpendicular to earth. Angle D in this figure represents the declination angle of the particular location. FIG. 2B shows the central post 10 and the horizontal jib 20 slanted toward sun 5 for the amount of declination angle. When central post is slanted toward one side, the parabolic mirror constructed around will also be slanted toward the sun. The determination of exact orientation of the parabolic collector requires careful planning and optimization decision and it is well know by those who are skilled in this art. Information necessary for determining the appropriate slant angle of the central post is available from open sources on World Wide Web for those who are skilled in this art.

The steps of the construction process are now explained with the aid of FIG. 2A. The first step in the process of parabolic mirror construction is the placement of the central post 10 to the ground at an appropriate angle D. Central post is driven into the ground with the required slant angle using commercially available pile drivers. In a preferred embodiment, the diameter of the central post is 1 meter and the pile should be driven into the depth of at least 6 meters. The diameter of the central post depends on the size of the parabolic mirror and can be adjusted accordingly. The actual depth of the pile is also dependent on the soil properties and it should be deep enough to support the weight of the horizontal jib and associated weights without buckling or getting loose. In another embodiment of the design, concrete may be poured into ground at the base location of the central post 10 and central post can be placed or erected over the concrete slab. Yet in another embodiment, the central post may be placed on a portable yet sturdy base which may be moved or relocated.

The second step of the construction method is explained with the aid of FIG. 2B. In this step, the horizontal jib 20 is attached to the central post 10 in such a way that horizontal jib can rotate around the central post freely 360 degrees. The height of central post 10 should be high enough for the horizontal jib to rotate in unobstructed manner. In a preferred embodiment the horizontal jib 20 is constructed using triangulated lattice structure which makes the horizontal jib lightweight yet mechanically strong. Horizontal jib has to be stable, sturdy and straight.

Figure 3:
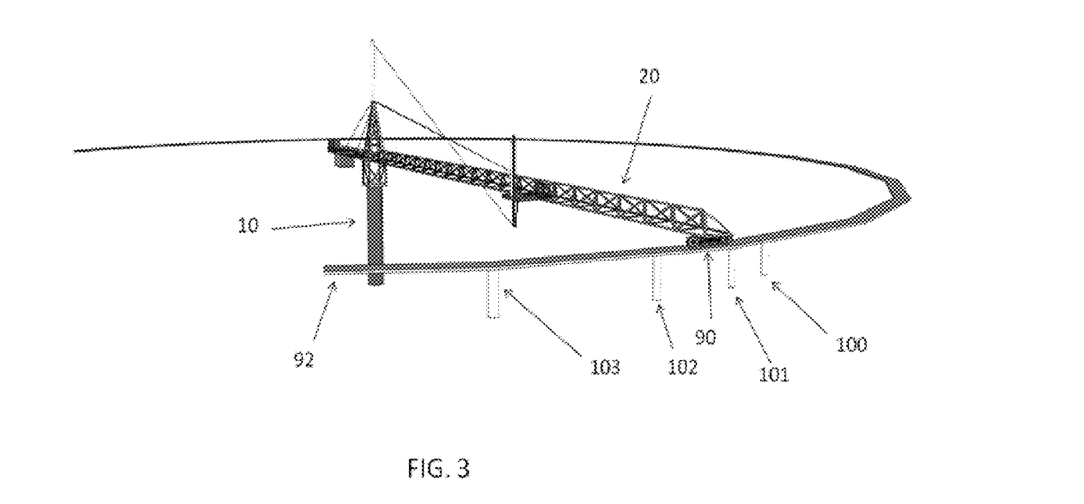
FIG. 3 shows the construction process of the outer rim of the parabolic mirror.

The third step in the process parabolic mirror construction is construction of the support rim and it is explained with the aid of FIG. 3. In this particular step, the horizontal jib 20 is fixed at the starting point of the rim and support pile 101 is driven into ground right underneath the tip of the horizontal jib 20. The height of the pile 101 is adjusted such that, the end point of the pile is at the same height with the end point of horizontal jib 20.

Figure 4:
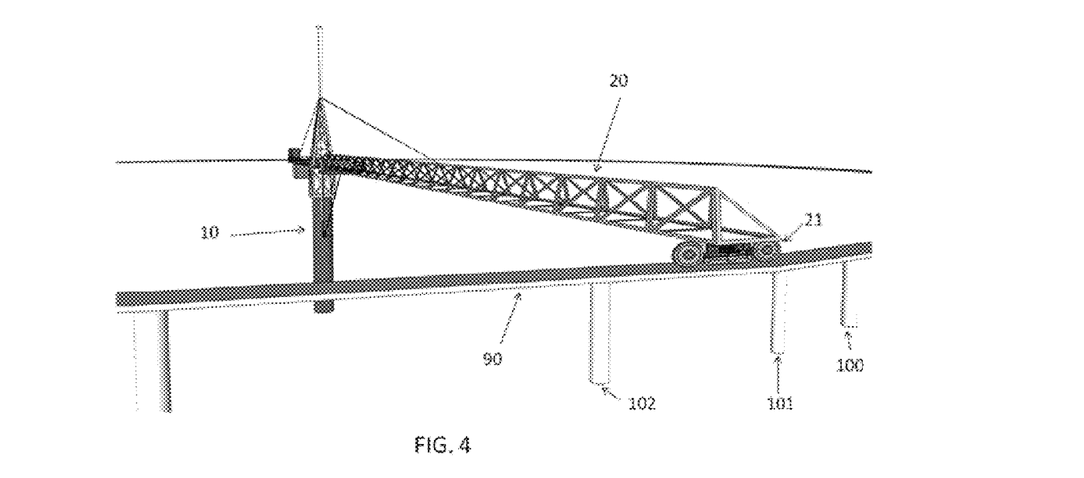
FIG. 4 shows the details of the tip of the horizontal jib while resting on the outer rim.

The process is repeated after horizontal jib 20 is rotated slightly and pile 102 is driven into the ground ending up at the same height as the end of jib 20. After driving more support piles into the ground repeating the same process, rim runner platform 90 is installed on piles 100, 101, 102 and 103. After completion of the process, a circular rim runner 92 will be spanning 360 degrees around the central post 10. Rim runner 92 is positioned at the same height as the tip of the horizontal jib 20. FIG. 4 shows the detailed view of the horizontal jib 20 resting on rim runner 92 with the aid of rollers 21 installed at the tip of the jib 20. The rim runner 92 defines the rim of the parabolic mirror and provides a support surface for the horizontal jib to rest and move all around the rim edge.

Figure 5A:
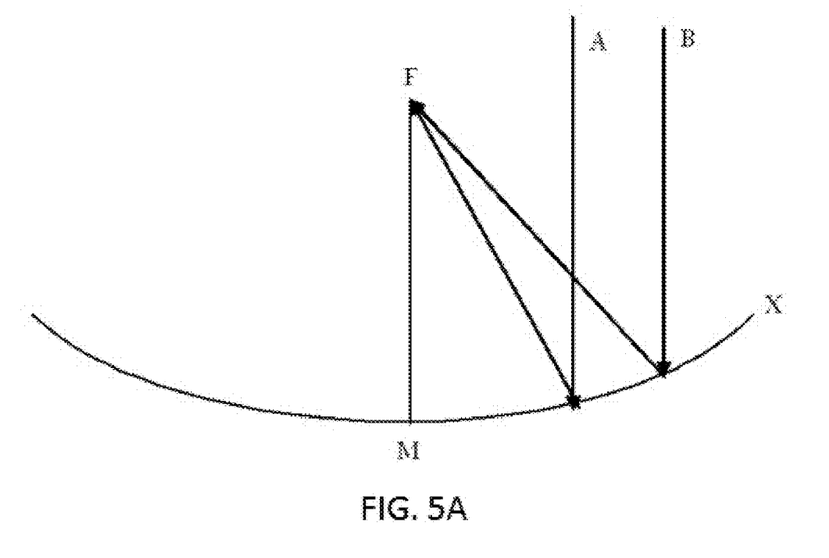
FIG. 5A shows the basic principle of parabolic mirror.
Figure 5B:
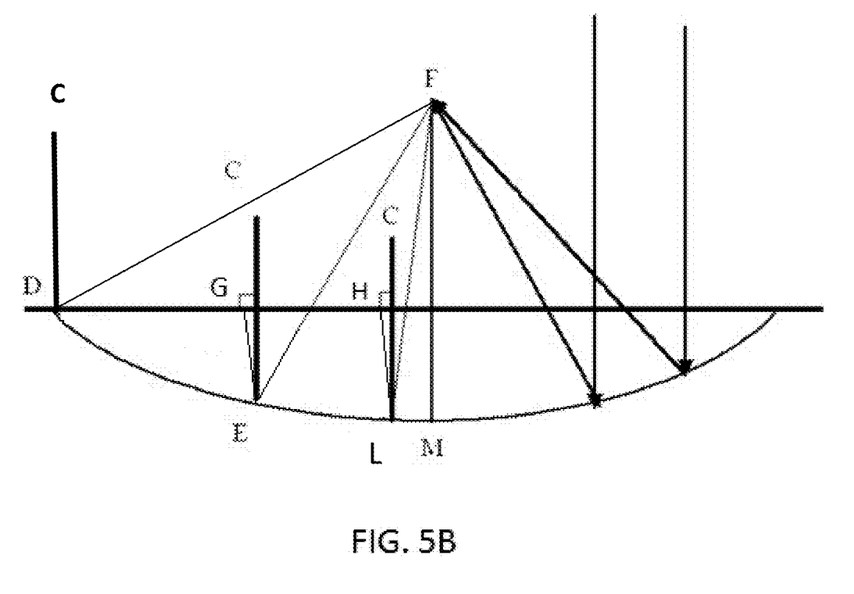
FIG. 5B shows the working principle of construction apparatus.

The fourth step of the construction method is explained by the aid of FIG. 5 series. FIG. 5A shows cross section of a perfect parabolic mirror. X represents the parabolic mirror with reflective face facing toward sun. Rays A and B are coming from the sun which is situated directly overhead and perpendicular to axis of MF of the parabolic mirror. F represents the focal point of the parabolic mirror. In a condition like this, the rays A and B will be reflected to point F of the mirror. FIG. 5B shows a geometrical property of parabolic mirror. Assuming D is a line that crosses parabolic mirror right at the center while passing over point center point of parabola designated as M, and C is a specific length line that is drawn perpendicular to line D, the following equations hold true:

distance $GE$+distance $EF$=constant,

The same formula is also valid for another instance, distance $HL$+distance $LF$=constant In the drawing G and H are points where line C crosses line D. In the drawing G and H are shown slightly apart from the crossing point for clarity.

Figure 5C:
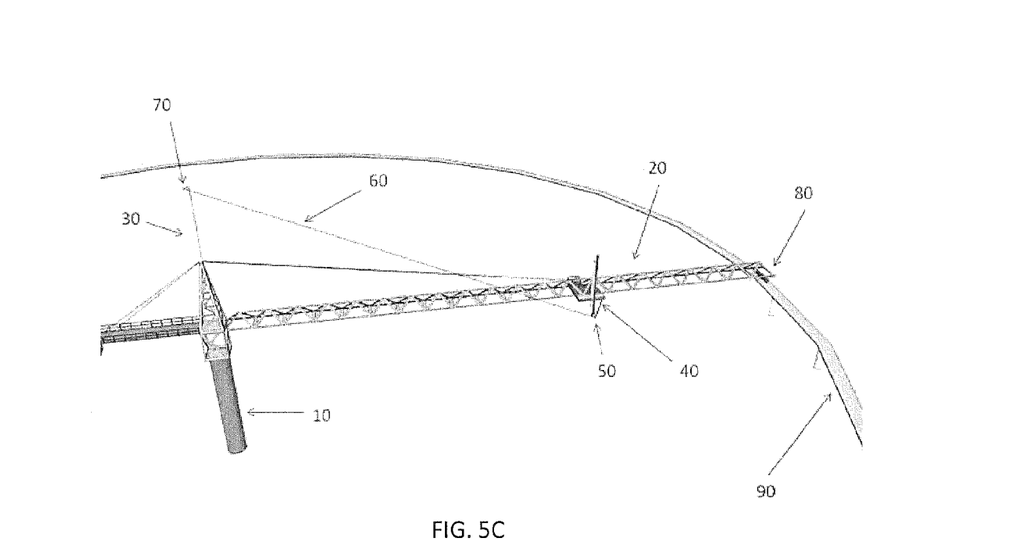
FIG. 5C shows the details of the pulley and string arrangement for determining the outlines of the parabolic shape.

The apparatus makes use of this geometrical property to define outline of the parabolic mirror which is further explained in FIG. 5C. Focal mast 30 is erected on top of the central post 10 in such a way that as horizontal jib 20 turns around central post 10, the focal mast 30 also turns with the horizontal jib assembly. The end point of the focal mast 30 is marked as 70 which define the focal point of the parabolic mirror being constructed. Item 35 is a trolley that runs freely along the horizontal jib 20 in the direction of 31-32. Item 40 is a vertical working arm installed on trolley 35 which can move up or down freely along the direction 39 which is parallel to central post 10 and perpendicular to horizontal jib 20. The tip of the vertical working arm 40 is designated as 50. An inelastic string 60 is connected to point 70 on one end and passes over a roller placed at point 50 and connected to point 46 on the other end. In this particular arrangement, as the trolley 35 moves along the horizontal jib 20 in the direction of 31 to 32, the tip 50 of the vertical working arm 40 defines a parabolic profile. Being inelastic, the length of string 60 remains constant but height of vertical arm 40 changes in accordance to the principle explained in FIG. 5B. The focal point of the parabola defined through this process is designated as 70. As the position of trolley 35 and the rotational angle of horizontal jib 20 is changed, many points describing the outline of the parabolic mirror are obtained.

The principle behind defining parabola is further explained as follows: Points 70, 50 and 46 in FIG. 5C define a triangle. In this triangle the following geometrical relation exist due to inelastic nature of the string:

(the distance from 70 to 50)+(the distance from 50 to 46)=constant

Vertical working arm 40 is perpendicular to horizontal jib 20 and can move up or down freely, As a result of these constraints, the height of vertical arm (from the ground to the tip point 50 which is shown as 39) varies as the trolley 35 is moved on horizontal jib 20 from point 80 toward the center post 10.

Figure 5D:
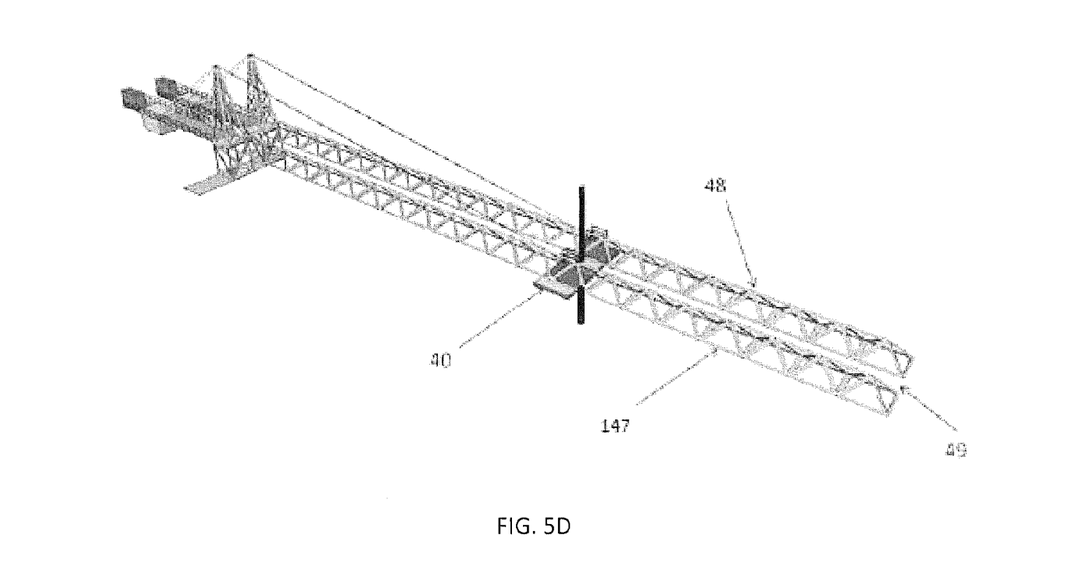
FIG. 5D shows the profile of an alternative embodiment of horizontal jib.

FIG. 5D shows another embodiment of horizontal jib 20 which is made up of two parallel arms 147 and 148. The trolley 35 is attached to both arms 147, 48 and there is a gap between two arms indicated as 49. In this embodiment, the trolley 35 can run along the gap 49.

This principle of defining outline of a parabola is used for determining location and height of the support piles of the parabolic mirror. This is explained using FIG. 6. Trolley 35 is installed on horizontal jib 20 and can travel freely along the jib in the direction of 31 to 32. The movement of the trolley is controlled by a motor assembly which is installed on the trolley 35. In another embodiment the trolley motor can be installed on either side of the horizontal jib 20. Item 33 is a pile driver which is installed on the trolley 35 right next to the vertical working arm 40. Vertical working arm 40 has a roller 41 attached at the tip of working arm which is designated as 50.

Figure 6:
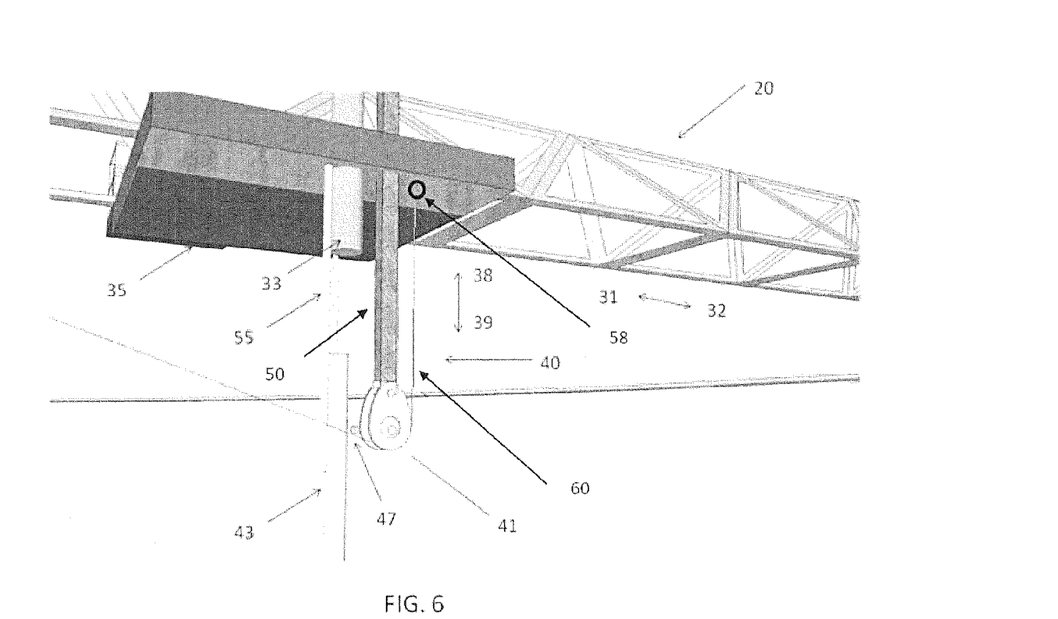
FIG. 6 shows the details of the string and pulley arrangement and the pile driver arrangement on the trolley including the proximity sensor set up.
Figure 7:
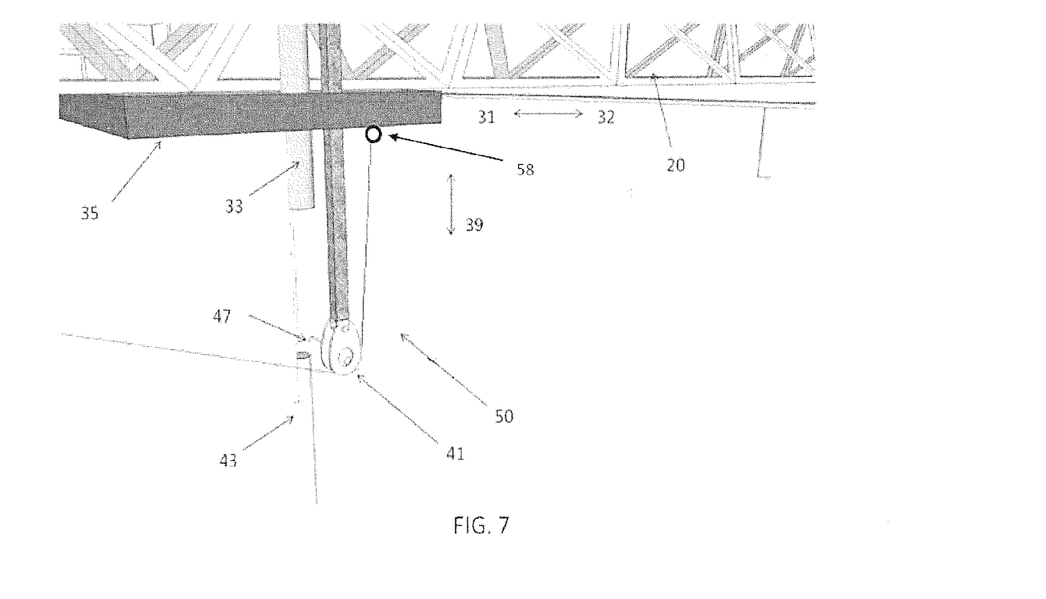
FIG. 7 shows the tip of the vertical arm and the pile driver with proximity sensor arrangement while a pile is driven to perfect depth indicated by the proximity sensor.

Inelastic string 60 which is connected to focal point on one end of the string and passes under the roller 41 and gets attached to the point 58 on the other end of the string. Item 47 is a proximity sensor which looks sideways toward the pile being driven labeled as 43. As the pile driver 33 drives the pile 43 to the ground by hammering, the proximity sensor 47 continuously checks the height of pile 43 and detects the condition when pile 43 is at the same height with roller 41. FIG. 7 shows the condition where the pile 43 is at the same height with the roller 41. At this point, the height of the support pile 43 is driven to the ground enough and hammering of pile 43 can be stopped.

In another embodiment of the invention the support piles are screwed to the ground rather than being hammered. In this case the pile driver 33 is replaced by a rotary motor which screws the pile 43 to the ground until proximity sensor 47 indicates appropriate height. In this particular embodiment support pile 33 is shaped like a screw.

Figure 8:
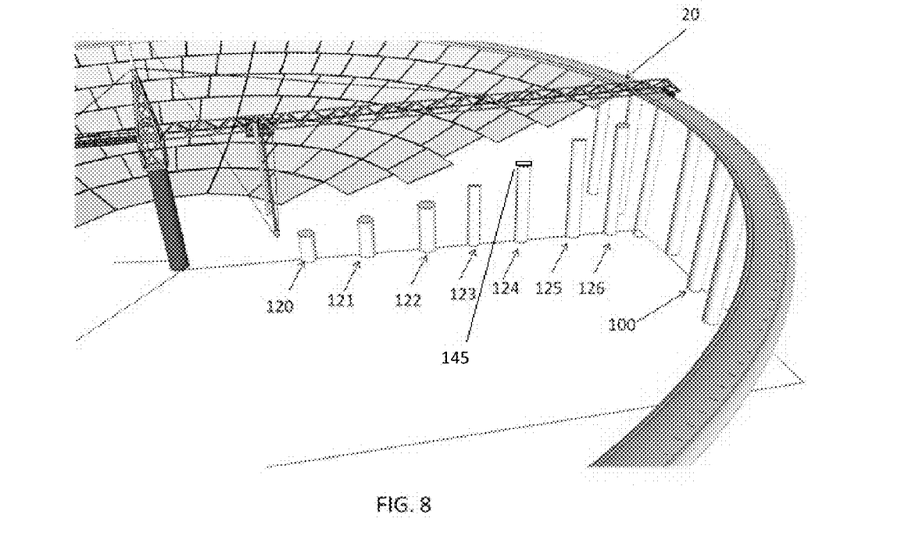
FIG. 8 shows series of piles driven to ground which outlines parabolic cross section.

FIG. 8 shows the case where a series of support piles are driven to the ground and the height of piles 120, 121, 122, 123, 124, 125 and 126 define outline of a parabola. The tips of the support piles are covered by a cap 145 which the thickness of the cap can be adjusted so that the overall height of the pile can be accurately adjusted. Even though the heights of the piles are controlled by the pile driver and the proximity sensor arrangement, due to coarse stroke size of the pile driver, the height of the support pile may not be accurate. In an embodiment of parabolic mirror where the focal length is 10 meters, the height of the support piles should be accurate to +/−2.5 mm. This is achieved by installing cap 145 with variable thickness so that height can be adjusted accurately.

Figure 9:
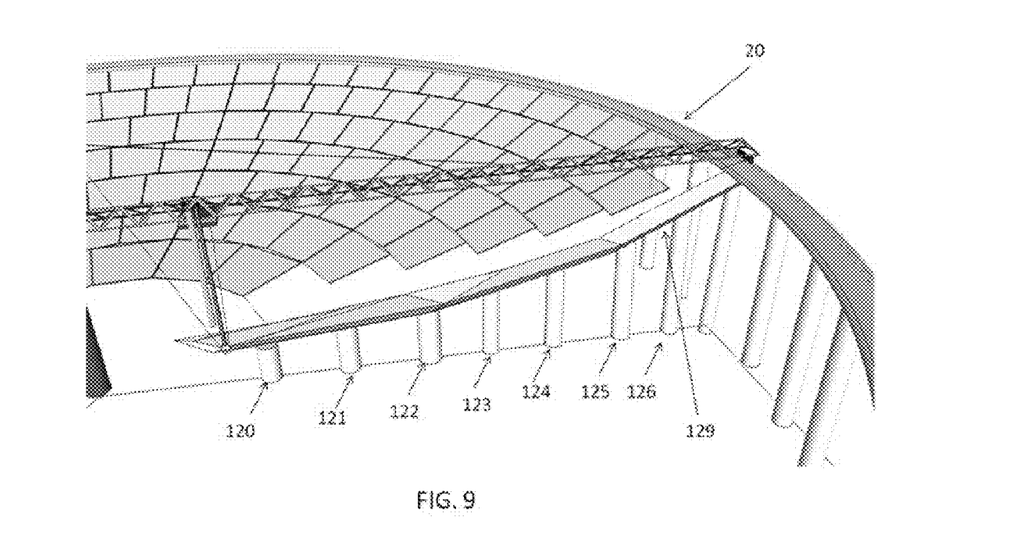
FIG. 9 shows a rib element mounted on set of piles which defines a parabolic outline.

FIG. 9 shows the next stage of the construction method where a rib labeled as 129 is installed on the piles 120, 121, 122, 123, 124, 125. Since the heights of these support piles already describe a parabolic mirror outline, the flat rib installed on theses piles also describe a parabolic contour.

Figure 10A:
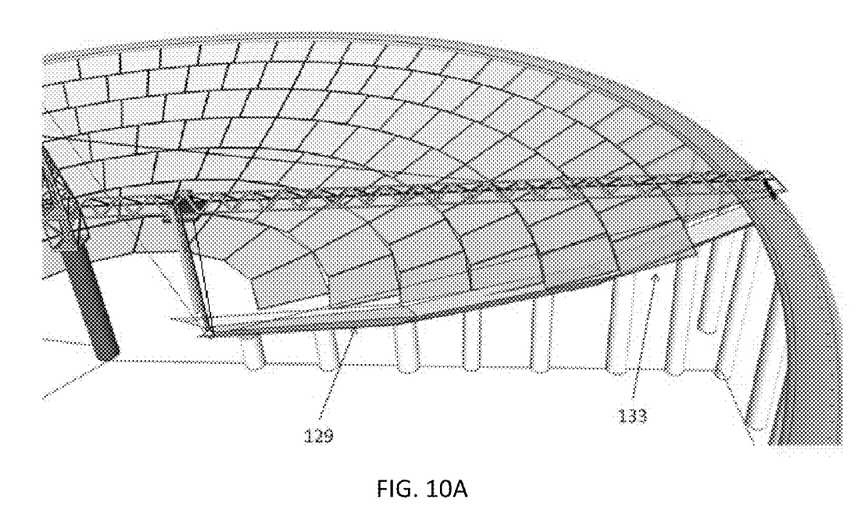
FIG. 10A shows the method of mounting mirror tiles on the rib.

FIG. 10 shows the next stage of the construction method where reflective mirror tiles like 133 are installed on the rib 129 forming reflective surface of parabolic mirror. The rib 129 forms a continuous and suitable platform for installing reflective tiles or sheets.

Figure 10B:
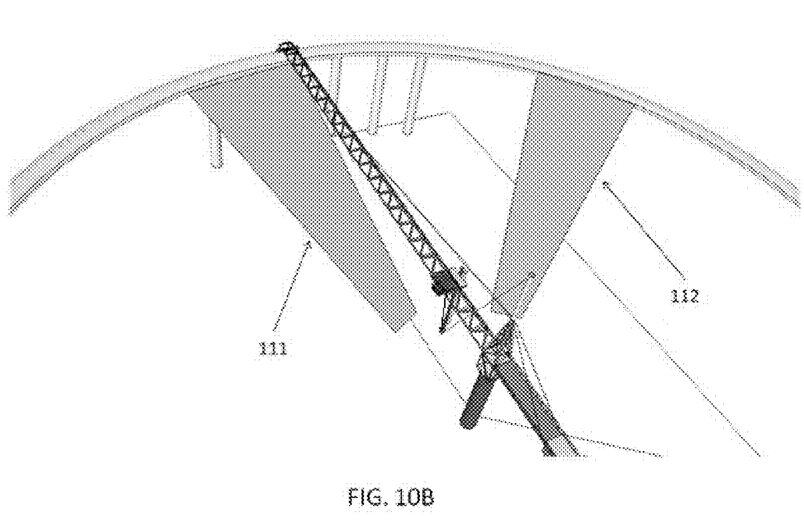
FIG. 10B shows an alternative way of covering set of parabolic ribs with continuous reflective sheets.

FIG. 10B shows an alternative embodiment of construction process where reflective mirror tiles are replaced by continuous reflective sheets like 111 and 112.

Figure 11:
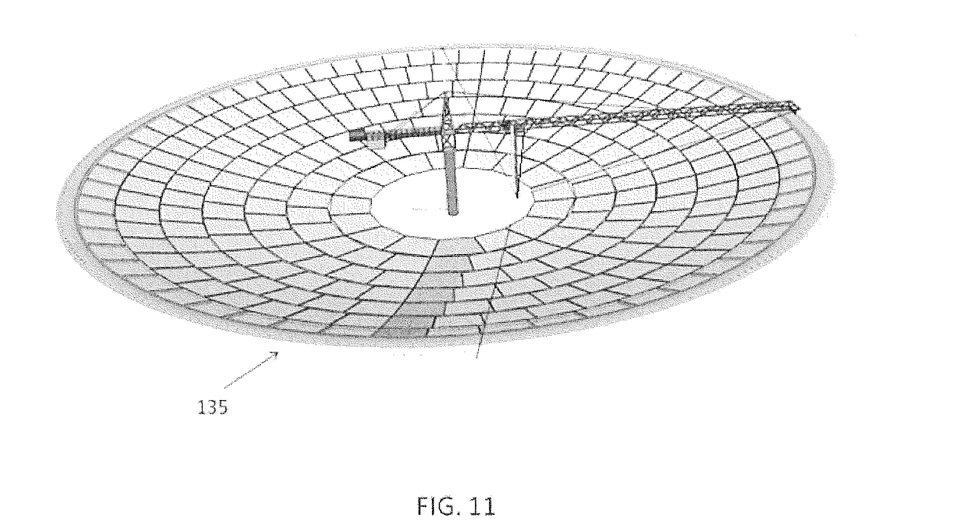
FIG. 11 shows the completed state of parabolic mirror construction.

FIG. 11 shows the completed parabolic mirror 135 with all mirror tiles installed.

Figure 12:
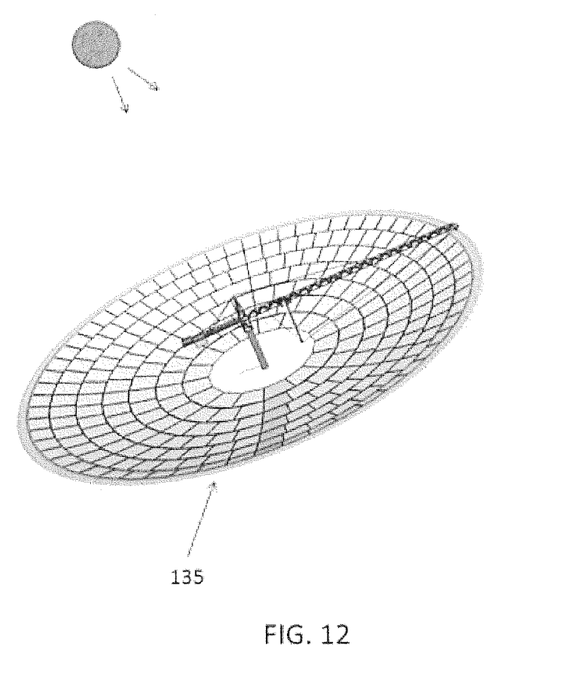
FIG. 12 shows the completed state of slanted parabolic mirror construction.

FIG. 12 shows the slanted version of the parabolic mirror arrangement 135 after the installation is completed.

Figure 13:
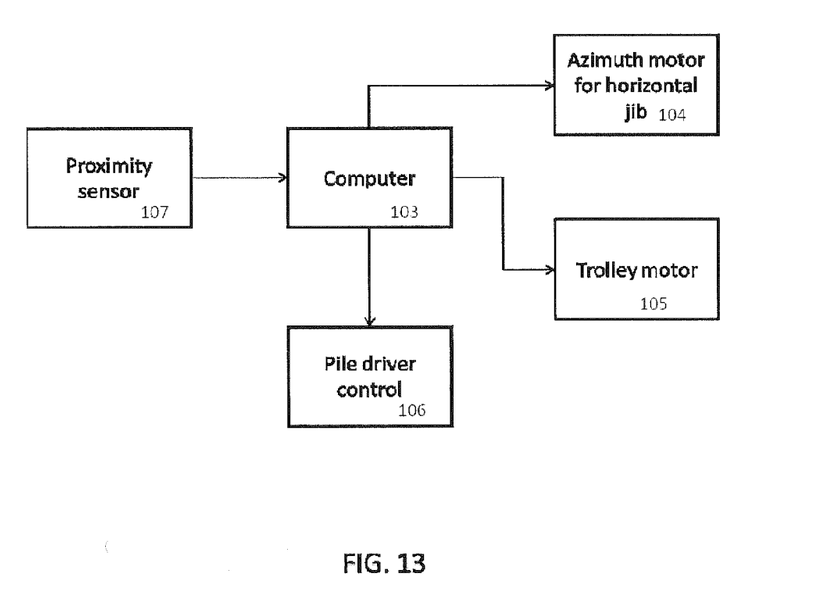
FIG. 13 shows the block diagram of electronics and the control elements that make up the apparatus.

FIG. 13 shows the block diagram of control system of the invention where the computer block 103 is interfaced to azimuth motor 104 which rotates the horizontal jib along central post axis, trolley motor 105 controlling position of the trolley travelling along horizontal jib, pile driver control 106 which controls the hammer or the screw motor that drives the piles to the ground and the proximity sensor 107 that determines the height of the piles. Computer 103 also runs algorithm for construction and cleaning process.

Figure 14:
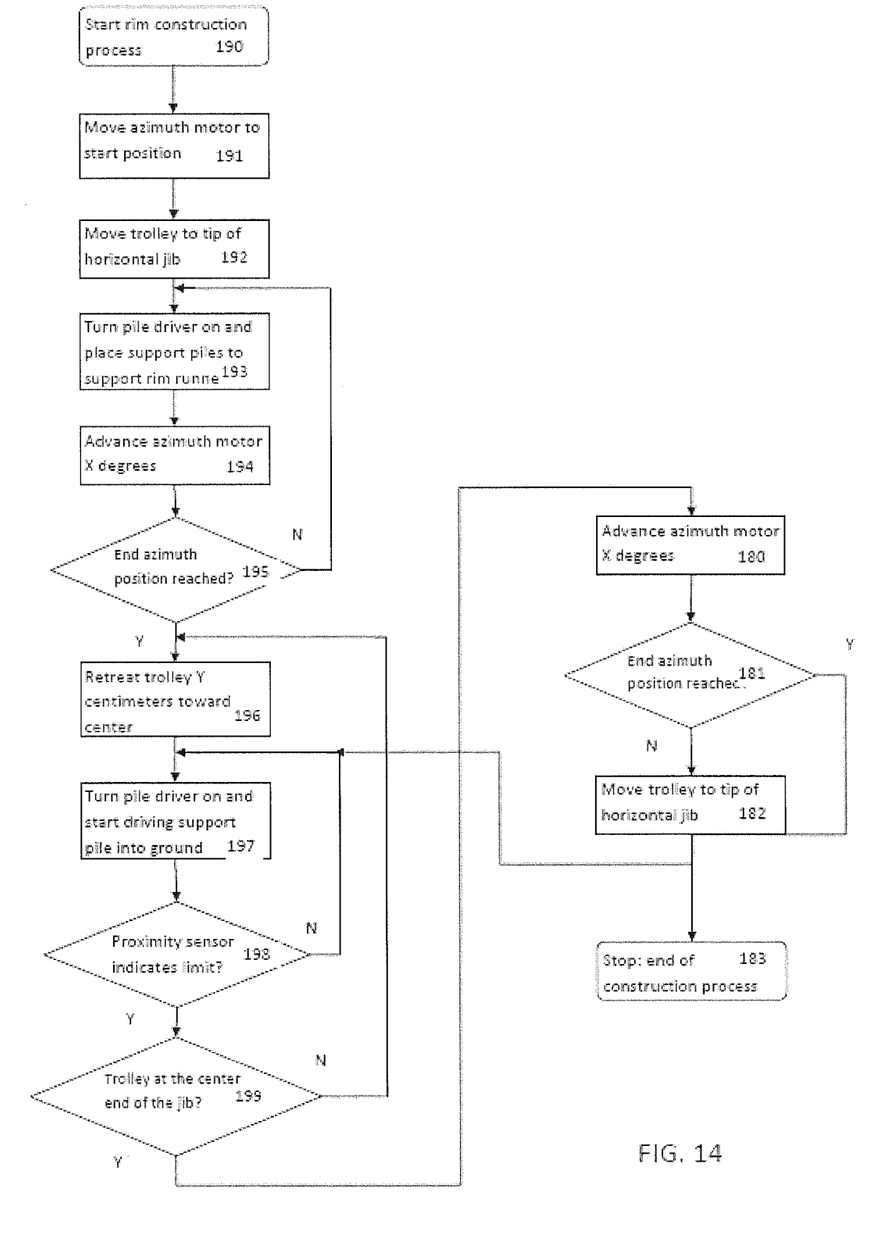
FIG. 14 shows the flowchart of construction process.

The flowchart of the operation is illustrated in FIG. 14 which shows the flow chart of the operation during the construction phase. The flowchart describes the steps for constructing the rim runner and support piles of the parabolic mirror.

The rim construction process (190) starts by bringing the azimuth motor to starting position (191). Starting position is an arbitrary position, but once selected it should be used as the starting position throughout the construction process. In this position the trolley is moved until the far end of the horizontal jib (192). At this stage the pile driver is turned on and the rim support piles are driven into ground (193). After the pile driving process is over, azimuth motor is activated and azimuth angle is increased for a predetermined amount (194). Horizontal jib is now pointing a different location. The process of pile driving is repeated for this new position (193). The process is repeated over and over again until the starting position is reached again (195). At the end of this process, the rim support piles are all driven into ground and rim runner should be installed on the rim support piles. Now the tip of the horizontal jib can be supported by the rim runner underneath.

The next process starts from the starting position of the horizontal jib. The trolley is moved toward the center for a predetermined distance (196). The pile driver is turned on and support pile is driven into ground (197) until the proximity sensor indicates the limit position is reached (198).

The process is repeated after moving the trolley toward center for another predetermined distance (199). The new piles are driven into the ground until proximity sensor indicates the limit position is reached. This process is repeated until trolley comes near the center post. The process is repeated by increasing azimuth angle (180) and repeating the process. Process finishes upon reaching the end azimuth position which is also the starting position (183).

Figure 15:
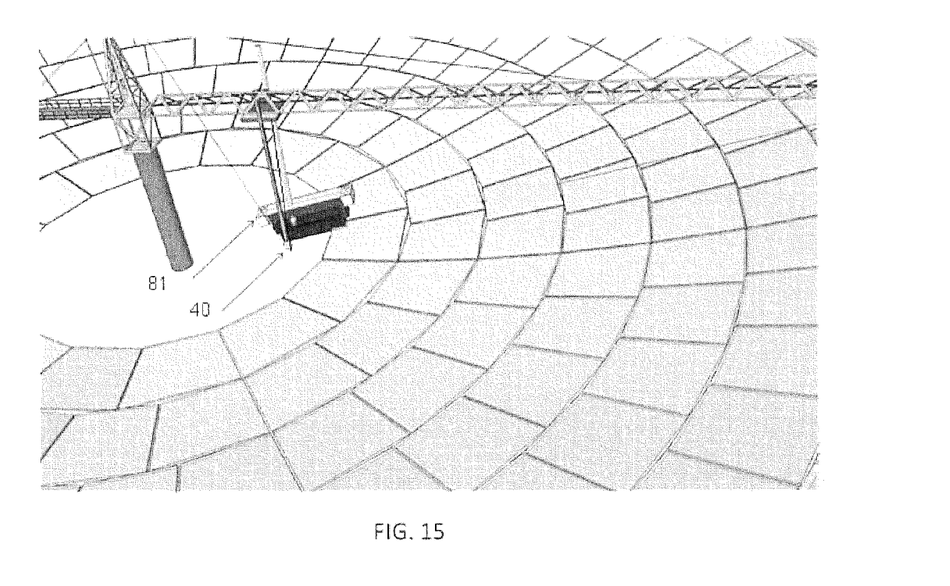
FIG. 15 shows the tip of the vertical arm and the trolley equipped with cleaning brush in cleaning configuration.

After construction of the parabolic mirror is over, the pile driver is removed from the trolley that transverses along the horizontal jib. Since construction process is over, the pile driver is no longer is needed. Instead of the pile driver, cleaning brush arrangement is installed on the trolley. This is shown in FIG. 15 where a rotating brush arrangement 81 is installed instead of the pile driver. Now the cleaning brush 81 and the vertical arm 40 can work in unison and clean the mirror tiles. In a preferred embodiment series of brushes are installed on the trolley in such a way that one of the brushes applies polishing compound, another brush buffs and another one cleans the mirror surface. Yet in another embodiment of the invention the brushes are replaced by high pressure water nozzles which spray water or cleaning liquid onto the mirror surface for cleaning purpose.

Figure 16:
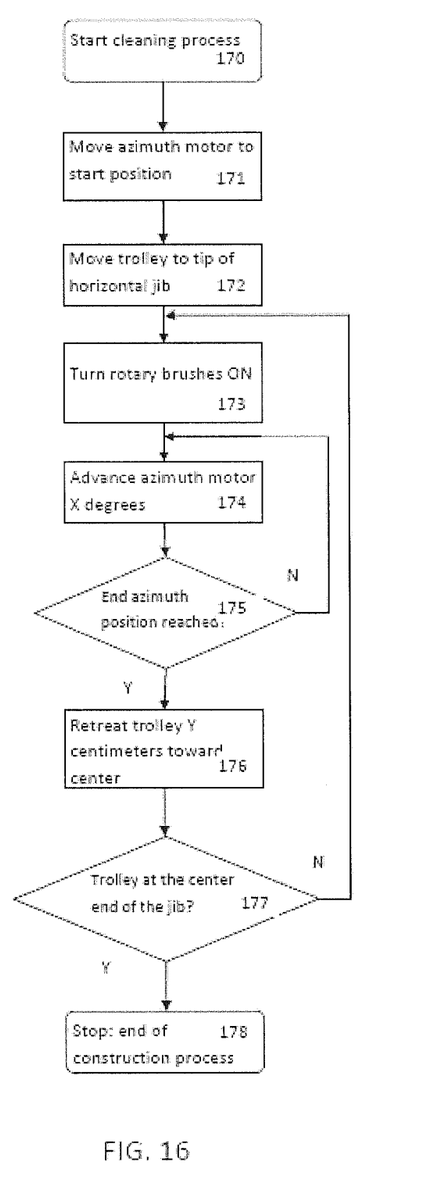
FIG. 16 shows the flowchart of cleaning process.

The cleaning process is also controlled by the computer system using the same control system shown in FIG. 13. FIG.

16 shows the flowchart of the cleaning process which essentially moves the motors in an organized way to clean the mirror.

The cleaning process (170) starts by moving azimuth motor to the starting position (171). The starting position is an arbitrary position selected, but once selected it should be maintained as the starting position throughout the cleaning process. The trolley is moved into the far end of the horizontal jib near the rim (172). The cleaning brush motor is turned on (173) and azimuth motor is rotated gradually (174) which causes the horizontal jib to rotate. Every time starting position is reached the vertical trolley is pulled toward the center (176) and process is repeated. Eventually every part of the mirror is cleaned through this process. At the end of the cleaning process the trolley is parked at the center position and process is finished (178).

The invention claimed is:

1. A method of manufacturing a parabolic solar collector, said method comprising:
   placing a central post into the ground, the central post having length, depth, and orientation in accordance with the desired parabolic solar collector,
   attaching a horizontal jib to the central post,
   constructing a rim support under a tip of the horizontal jib,
   attaching a trolley that can move along the horizontal jib,
   attaching a vertical working arm to the trolley in a perpendicular position that can move freely up or down on the trolley,
   restraining the vertical working arm with an inelastic string connected to a tip of the central post on a first end of the string and to the trolley on a second end of the string while the vertical working arm rests on the inelastic string by way of rollers,
   driving support piles into the ground in proximity to the vertical arm to a height indicated by the vertical arm,
   turning the horizontal jib incrementally around the central post in regular angular increments and driving support piles into the ground at new locations,
   moving the trolley along the horizontal jib incrementally with regular distance increments and driving support piles into the ground at new locations,
   placing rib elements on tips of said support piles, and
   placing at least one sheet with a mirror like surface on said rib element to form a parabolic shaped reflecting surface.

2. The method of claim 1, wherein a tip of the central post defines a focal point of the parabolic mirror.

3. The method of claim 1, wherein the horizontal jib turns freely around the central post and the rim support is placed under a tip of the horizontal jib.

4. The method of claim 1, wherein the vertical working arm moves freely up and down under gravity or by hydraulic, pneumatic or electrical means.

5. The method of claim 1, wherein the inelastic string connected to the tip of the central post is only long enough to let the trolley reach the tip of the horizontal jib.

6. The method of claim 1, wherein driving support piles into the ground comprises driving the support piles pneumatically, hydraulically, or electrically.

7. The method of claim 1, further comprising selecting increments for turning and moving in such a way that the tips of support piles and the rib element form a parabolic shape.

8. The method of claim 1, wherein the said sheet with a mirror like surface comprises one continuous sheet forming a parabolic shaped reflecting surface.

9. The method of claim 1, wherein said sheet with a mirror-like surface comprises a plurality of mirrored tiles arranged to form a parabolic reflecting surface.

10. An apparatus for manufacturing a parabolic solar collector, said apparatus comprising: a central post, a horizontal jib, a trolley travelling along the horizontal jib, an inelastic string having a first end connected to a tip of the central post and a second end connected to the trolley, a vertical working arm placed perpendicularly on the trolley, the vertical working arm moving freely up or down and resting on the inelastic string, a proximity sensor at a tip of the vertical working arm, a motor for incrementally turning the horizontal jib around the central post, a motor for moving the trolley along the horizontal jib incrementally, a computer for controlling the movement and for reading the proximity sensor, a set of one or more brushes, and a pile driving attachment.

11. The apparatus of claim 10, wherein the horizontal jib is attached to the central post and rotated by the motor in such a way that the horizontal jib rotates around the central post under the control of the computer.

12. The apparatus of claim 10, wherein the computer is configured to control movement of the trolley by the motor along the horizontal jib.

13. The apparatus of claim 10, wherein the inelastic string is long enough to let the trolley reach no further than an end of the horizontal jib.

14. The apparatus of claim 10, wherein the vertical working arm resting on the inelastic string is forced to move up or down as the trolley travels along the horizontal jib as a result of changing geometry of the inelastic string.

15. The apparatus of claim 10, wherein the pile driver is attached to the trolley in such a way that the pile driver is parallel to the vertical working arm and in close proximity to the vertical working arm.

16. The apparatus of claim 15, wherein a distance between the pile driver and the vertical working arm is such that the proximity sensor senses the existence of the piles being driven within said distance.

17. The apparatus of claim 10, wherein the pile driver comprises a rotating screw driving motor to screw the support piles to ground.

18. The apparatus of claim 10, where the vertical arm, the inelastic string arrangement and the proximity sensor indicate an exact height for the support piles for the specific angular position of the horizontal jib and the specific position of the trolley travelling along the horizontal jib.

19. The apparatus of claim 18, wherein the support piles are driven into the ground up to the height indicated by the proximity sensor.

20. The apparatus of claim 10, wherein the set of one or more brushes is attached to the tip of the vertical working arm in close proximity to the proximity sensor in such a way that the brushes are positioned at the same height as the proximity sensor.

* * * * *